UNITED STATES PATENT OFFICE.

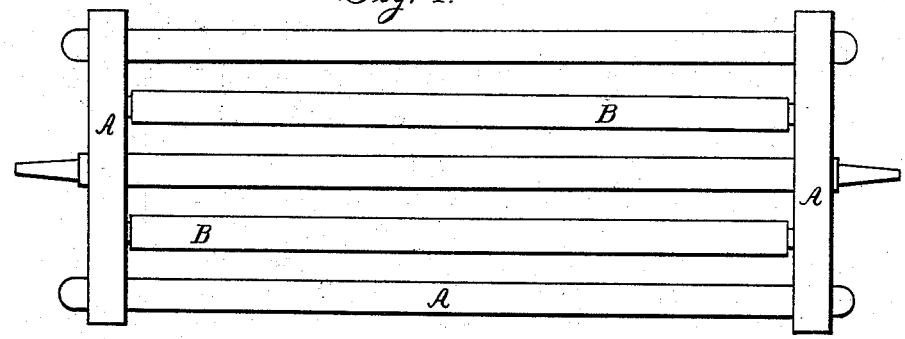
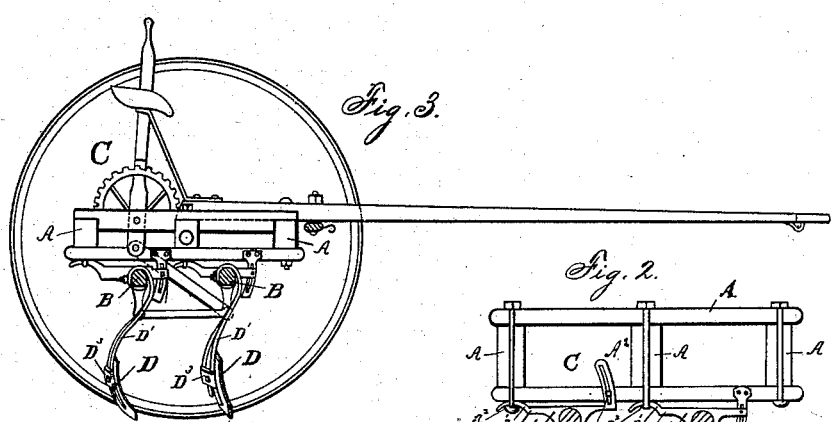
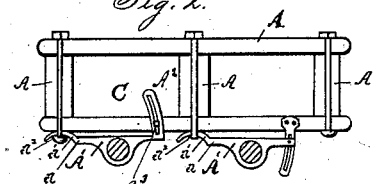
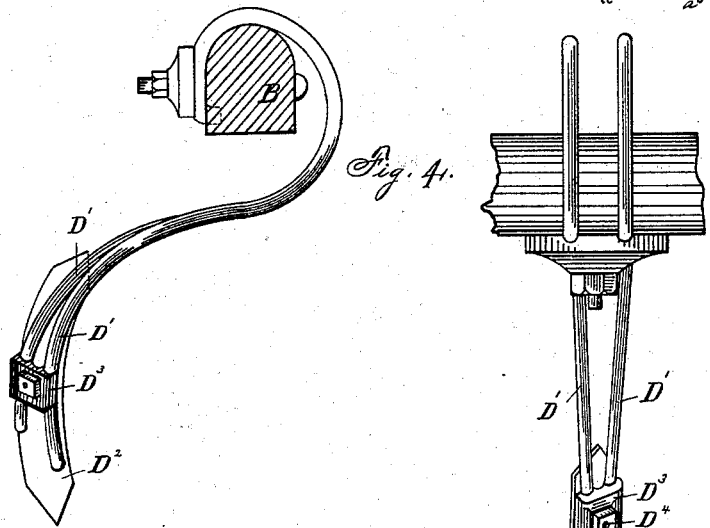

PHILIP F. WELLS, OF MILFORD, MICHIGAN, ASSIGNOR OF ONE-HALF TO H. A. KIPP, OF SAME PLACE.

SPRING-TOOTH HARROW.

SPECIFICATION forming part of Letters Patent No. 274,684, dated March 27, 1883.

Application filed March 27, 1882. (No model.)

*To all whom it may concern:*

Be it known that I, PHILIP F. WELLS, of Milford, county of Oakland, State of Michigan, have invented a new and useful Improvement in Spring-Tooth Harrows; and I declare the following to be a full, clear, and exact description of the same, such as will enable others skilled in the art to which it pertains to make and use it, reference being had to the accompanying drawings, which form a part of this specification.

My invention consists in the combination of devices and appliances hereinafter specified, and more particularly pointed out in the claims.

In the drawings, Figure 1 is a plan view of a harrow-frame such as I propose to use in the embodiment of my invention. Fig. 2 is an end view of the frame, showing the mechanism for adjusting the rollers or beams. Fig. 3 is a transverse section of the frame, showing the mechanism for elevating and depressing the teeth. Fig. 4 represents separate views of my improved spring-tooth.

The object of my invention is, first, the production of a spring-tooth wheel-harrow on which the beams or rollers to which the teeth are attached may be adjusted up or down, so as to give to its teeth any desired depth of cut, thereby enabling the operator to give to all the teeth the same action, even though the frame may be somewhat tilted up or down out of its proper horizontal position; second, the production of a spring-tooth applicable alike to either wheel or floating harrows, said tooth being formed of two or more lengths of rod, with their ground ends free, so that a point or shovel fastened to the extremities may be given any desired flare to the right or left by simply loosening its fastenings, turning it, and then clamping it again to the rods.

A represents any ordinary frame of a wheel-harrow.

B represents rollers or beams to which the teeth are attached.

The letter C indicates the usual lever for revolving the beams; these beams being journaled at their ends and provided with rigid projecting arms, the arm of one being connected to the arm of the other by a connecting-rod, and to the lever C by a link, so that by operating said lever both beams may be given a partial rotation simultaneously In Fig. 2, A' represents a bearing or boxing adapted to receive the extremities of the beams B, and constructed with a horizontal arm, $a$, upon one side, which is slotted and curved at its outer end, $a'$, said end being properly secured to the lower cross-bar of the frame, as shown at $a^2$. The bearing is also provided on its opposite side with a perpendicular slotted arm, the construction being such that it may be secured by a bolt to the frame, and adjusted upward or downward upon it, as may be desired, in order to bring the rows of teeth more evenly into the ground—as, for instance, when the tongue is elevated—so as otherwise to throw the front row of teeth upward while the rear teeth are depressed, or vice versa.

D represents a spring-tooth constructed of two spring bars or rods, D', and a point, $D^2$, of any suitable width and length, secured thereto.

The rods D' have no direct connection with each other at their lower ends; but it is immaterial whether they are separated or joined together at the upper end of the tooth. Said rods are adapted to be rigidly secured at the upper ends to a beam or roller in any proper manner. I prefer that said rods should be attached to the beam or roller and caused to curve over it and thence downward, the curve about midway between the extremities of the rods, then taking the opposite direction, as shown in the reversed curve of Fig. 4; but it is evident that the upper portion of the rods may be attached to the bars upon any side of the same and take any appropriate course to the lower end. The point $D^2$ is adapted at either end to enter the soil, and is attached to the free ends of the rods D' by means of a clip, $D^3$, on the opposite side of the rods, said clip being made with channels or grooves to engage the rods, and secured to the point $D^2$ by a bolt, $D^4$. The lower ends of the rods D' being free and separable from each other, by loosening the nut upon the bolt $D^4$, the point $D^2$ may be rotated about its vertical axis as desired, and set at any required angle to prevent one tooth from following another, and to throw the soil in any desired direction. It will be readily understood that when the clip is only slightly loosened the rods cannot escape laterally from the grooves, and when the clip and tooth are turned, the rods being elastic, one rod will be thrown forward and the other rearward, according to the direction in which the tooth and clip are turned. If, now, after turning the clip and tooth, the nut on the bolt is screwed up tight, the rods will be firmly clamped and cannot turn or spring back to their original positions, but will be firmly held in the positions to which adjusted, supporting the tooth in its oblique position. The point $D^2$ may also be reversed in its adjustment upon the rods $D'$ when one end becomes worn and dull.

It is evident that two or more rods $D'$ may be used, as described, in the tooth D, or a single rod may be used with two or more prongs at its lower end, still embodying the principle of my invention. It is evident also that this spring-tooth D may be used in cultivators or harrows, or other similar implements.

I am aware that a harrow has been provided with a series of tooth-bearing bars which may be adjusted separately or simultaneously, and I am also aware that a harrow-tooth has been formed of two spring-rods to which a point is clamped, and I do not claim either of these constructions.

What I claim is—

1. A spring harrow-tooth consisting of two or more spring-rods with their lower ends free, and in connection therewith a tooth or shovel and means for clamping the shovel to the rods and allowing its laterally oblique adjustment, substantially as described.

2. The combination, with the harrow-beam, of the two spring-rods separated at their lower ends, the point, and the grooved clip, substantially as described.

3. A harrow-tooth composed of the two spring-rods separated at their lower ends, the point, the clip having grooves to receive the rods, and the bolt and nut for clamping the clip and tooth together, the whole being adapted to operate as described.

4. The combination, with the tooth-carrying bars, of the bearing-bars $A'$, pivoted at one end and having at the other end a projecting arm, $A^2$, provided with a curved slot, and a bolt, $a^3$, projecting from the harrow-frame through said slot, and provided with a nut, by means of which the projecting arm may be secured, substantially as described.

5. The combination, with the tooth-carrying bars, of the bearing-arms $A'$, having at one end the curved portion $a'$, the supports $a^2$, in which said curved portions rest, and means for adjusting the opposite end of the bearing-arm vertically, substantially as described.

In testimony whereof I sign this specification in the presence of two witnesses.

PHILIP F. WELLS.

Witnesses:
S. H. WILHELM,
A. C. ORVIS.